3,069,426
1-AROYLPROPYL-4-ARYL-4-CYANOPIPERIDINES
Paul A. J. Janssen, Vosselaar, near Turnhout, Belgium, assignor to Research Laboratorium Dr. C. Janssen N.V., Beerse, Belgium, a company of Belgium
No Drawing. Filed Apr. 27, 1960, Ser. No. 24,919
3 Claims. (Cl. 260—294.7)

The present invention relates to a new group of cyanopiperidine derivatives and more particularly to 1-aroyl-propyl-4-aryl-cyanopiperidines of the general structural formula

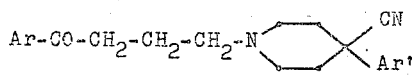

wherein Ar and Ar' are phenyl, tolyl, or halophenyl radicals. The halophenyl radical represented can be fluorophenyl, chlorophenyl, bromophenyl, or iodophenyl.

The compounds of this invention show activity both as hypnotic and analgesic agents.

The preparation of the compounds described herein is carried out by heating an aroylpropyl halide of the formula

with an appropriately selected 4-aryl-4-cyanopiperidine.

The organic bases of this invention form pharmaceutically acceptable salts with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfanate, ethyl toluenesulfonate, ethylene chlorohydrin, propylene chlorohydrin, allyl bromide, methallyl bromide and crotyl bromide.

The preparation of these compounds will appear more fully from a consideration of the following examples which are given for the purpose of illustration only and are not to be construed as limiting the invention in spirit or in scope. In these examples quantities are indicated as parts by weight, temperatures in degrees centigrade (° C.), and pressure in millimeters of mercury (mm.).

Example 1

To a mixture of 119 parts of N,N-(β,β-dihydroxy)diethyl amine and 54 parts of 2 N sodium carbonate are added 190.5 parts of 4-toluenesulfonyl chloride. This mixture is heated to about 95° C. for about one hour and then cooled to 0° C. and filtered. The filtrate is extracted with ether. After evaporation of the ether, the residue is crystallized from a mixture of 2-propanol and petroleum ether by chilling at —20° C., and then recrystallized from a 1:3 by volume mixture of ethanol and acetone to yield N-(4-toluenesulfonyl)-N,N-(β,β-dihydroxy)diethyl amine. A mixture of this compound and 690 parts of thionyl chloride is heated gently at 125° C. for about an hour and then cooled. The excess thionyl chloride is evaporated and the residue is purified by crystallization from dry toluene to yield N-(4-toluenesulfonyl)-N,N-(β,β-dichloro)-diethyl amine.

To a solution of 592.5 parts of this compound and 270 parts of 4-fluorophenylacetonitrile in 2000 parts of dry toluene are added portionwise 345 parts of a 50% suspension by weight of sodamide in xylene while the temperature is maintained at about 45–50° C. After the initial reaction has subsided, the mixture is heated slowly to boiling and then refluxed for 2 hours. After cooling, water is added to decompose the mixture. The precipitate is collected, washed with 2-propanol, and dried to yield 1 - (4 - toluenesulfonyl) - 4-cyano - 4 - (fluorophenyl)piperidine melting at about 186.5–188° C.

By substituting the appropriate starting materials in the above procedure, the following compounds are obtained:

1-(4-toluenesulfonyl)-4-cyano-4-phenylpiperidine.
1 - (4 - toluenesulfonyl) - 4 - cyano - 4 - (3 - tolyl)-piperidine.
1 - (4 - toluenesulfonyl) - 4 - cyano - 4 - (4 - tolyl)-piperidine.
1 - (4 - toluenesulfonyl) - 4 - cyano - 4 -(3 - fluorophenyl)piperidine.
1 - (4 - toluenesulfonyl) - 4 - cyano - 4 - (4 - iodophenyl)piperidine.
1 - (4 - toluenesulfonyl) - 4 - cyano - 4 - (4 - chlorophenyl)piperidine.

Example 2

A mixture of 52.5 parts of 1-(4-toluenesulfonyl)-4-cyano-4-(4-chlorophenyl)piperidine, 26.4 parts of phenol, 322 parts of a 30% solution of hydrogen bromide in acetic acid is heated for 24 hours at about 40° C., cooled, and filtered. The precipitate is saved. The filtrate is poured into dry ether and the solid which precipitates is collected and combined with the precipitate saved from above. This combination is dissolved in water. The solution is then boiled with activated charcoal, rendered alkaline, and extracted with ether. The extract is then evaporated to yield 4-cyano-4-(4-chlorophenyl)piperidine melting at about 77–78.5° C.

By substituting equivalent quantities of the starting materials in the above procedure, the following compounds are obtained:

4-cyano-4-phenylpiperidine.
4-cyano-4-(3-tolyl)piperidine.
4-cyano-4-(4-tolyl)piperidine.
4-cyano-4-(3-fluorophenyl)piperidine.
4-cyano-4-(4-iodophenyl)piperidine.
4-cyano-4-(4-chlorophenyl)piperidine.

Example 3

A mixture of 5.4 parts of γ-chlorobutyrophenone, 5.5 parts of 4-cyano-4-phenylpiperidine, 7.8 parts of sodium carbonate, and 0.1 part of potassium iodide in 120 parts of 4-methyl-2-pentanone is refluxed for 115 hours, cooled, and partitioned between water and ether. The ether layer is separated, diluted with additional ether and dried. Hydrogen chloride gas is passed through the solution. The solid precipitate is collected on a filter and then recrystallized from acetone by chilling at —20° C. to yield 1 - (γ - benzoylpropyl) - 4 - cyano - 4 - phenyl - piperidine hydrochloride melting at about 206–207.6° C.

By substituting 4-cyano-(3-fluorophenyl)-piperidine in the procedure of the above paragraph, 1-(γ-benzoylpropyl)-4-cyano-4-(3-fluorophenyl)piperidine hydrochloride of the structural formula

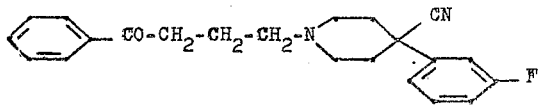

is obtained.

*Example 4*

To a suspension of 341 parts of aluminum chloride in 1740 parts of carbon disulfide are added 96 parts of fluorobenzene with stirring and cooling. While the temperature is maintained at about 10° C., 141 parts of γ-chlorobutyryl chloride are added. After the addition is completed, the cooling bath is removed and the stirring is continued for about 2 hours. The reaction mixture is poured into ice water. The organic layer is separated, washed with water, dried over anhydrous sodium sulfate, and filtered. The filtrate is concentrated under reduced pressure, and the residue is distilled to yield γ-chloro-4-fluorobutyrophenone boiling at about 136–142° C. at 6 mm. pressure.

The free base of 4-cyano-4-phenylpiperidine hydrochloride is liberated by dissolving 14.2 parts of the salt in water, rendering the solution alkaline, extracting the solution with ether, and drying and evaporating the ether extract. The residue, 6.4 parts of γ-chloro-4-fluorobutyrophenone, 0.1 part of potassium iodide, and 120 parts of toluene is heated in a sealed tube for 96 hours at 110–120° C., cooled, and filtered. The filtrate is partitioned between water and ether, and the layers are separated. The organic layer is first dried and then hydrogen chloride gas is introduced into the solution. The precipitate is collected, crystallized from a 2:1 mixture of acetone and 2-propanol, and then recrystallized from a 3:1 mixture of acetone and 2-propanol by allowing the solution to stand for 2 days at room temperature to yield 1-[γ-(4-fluorobenzoyl)propyl]-4-cyano-4-phenylpiperidine hydrochloride melting at about 224.5–230.4° C.

*Example 5*

A mixture of 4 parts of γ-chloro-4-fluorobutyrophenone, 8.2 parts of 4-cyano-4-(3-tolyl)piperidine, 0.1 part of potassium iodide, and 120 parts of toluene is heated in a sealed tube at about 120° C., cooled, and then filtered. The filtrate is washed with water, boiled with activated charcoal, and then evaporated. The residue is dissolved in diisopropyl ether. The solution is chilled at −20° C. to yield 1-[γ-(4-fluorobenzoyl)propyl]-4-cyano-4-(3-tolyl)piperidine melting at about 70.6–72.8° C. as a precipitate. The hydrochloride of this compound melts at 239.5–242° C.

By substituting bromobenzene in the first paragraph of Example 4, γ-chloro-4-bromobutyrophenone is obtained. An equimolar substitution of this compound for γ-chloro-4-fluorobutyrophenone in the above paragraph and otherwise following the outlined procedure, yields 1-[γ - (4 - bromobenzoyl)propyl] - 4 - cyano-4-(3-tolyl)-piperidine. The compound has the structural formula

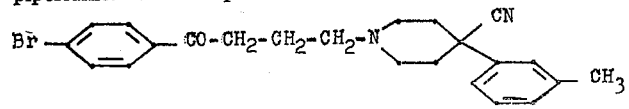

*Example 6*

A mixture of 4 parts of γ-chloro-4-fluorobutyrophenone, 8.2 parts of 4-cyano-4-(4-tolyl)piperidine, 0.1 part of potassium iodide, and 120 parts of toluene is heated in a sealed tube for 90 hours at 120° C. and then filtered. The filtrate is washed with water, dried over sodium sulfate, boiled with activated charcoal, and then evaporated. The residue is crystallized from diisopropyl ether by chilling at −20° C. to yield 1-[γ-(4-fluorobenzoyl)propyl]-4-cyano-4-(4-tolyl)-piperidine melting at about 92.6–96.6° C.

*Example 7*

A mixture of 4 parts of γ-chloro-4-fluorobutyrophenone, 9.1 parts of 4-cyano-4-(4-chlorophenyl)-piperidine, 0.1 part of potassium iodide, and 120 parts of toluene is heated in a sealed tube for 90 hours at about 120° C. and then cooled. The filtrate is washed with water, dried, decolorized with activated charcoal, and evaporated. The residue is dissolved in a mixture of diisopropyl ether and ether. Hydrogen chloride gas is passed through the solution. The solid which precipitates is collected on a filter and then dissolved in hot water. Upon acidifying the hot aqueous solution to a pH of about 1 and cooling, a solid precipitates. The solid is collected on a filter and then crystallized from 2-propanol to yield 1-[γ-(4-fluorobenzoyl)propyl] - 4 - cyano-4-(4-chlorophenyl)piperidine hydrochloride melting at about 242.5–243.5° C.

By substituting chlorobenzene in the first paragraph of Example 4, γ,4-dichlorobutyrophenone is obtained. This compound is then substituted for γ-chloro-4-fluorobutyrophenone and 4-cyano-4-(4-iodophenyl)piperidine for 4-cyano-4-(4-chlorophenyl)piperidine in the procedure of the above paragraph and 1-[γ-(4-chlorobenzoyl)propyl]-4-cyano-4-(4-iodophenyl)piperidine hydrochloride is obtained.

*Example 8*

A Grignard reagent of 3-fluorophenylmagnesium bromide is prepared by reacting 6.7 parts of magnesium with 94.5 parts of 3-bromofluorobenzene in 80 parts of ether. Then 21 parts of γ-chlorobutyronitrile in 64 parts of ether are added and the mixture is refluxed under nitrogen for two hours with stirring. The mixture is then allowed to stand at room temperature for 15 hours and the excess Grignard reagent is decomposed by the addition of 56 parts of concentrated hydrochloric acid and 50 parts of water. The organic layer is separated, dried over anhydrous sodium sulfate, filtered, and concentrated under reduced pressure. The residue is distilled to yield γ-chloro-3-fluorobutyrophenone boiling at about 105–125° C. at 2 mm. pressure.

Substitution of γ-chloro-3-fluorobutyrophenone in the procedure of Example 6 yields 1-[γ-(3-fluorobenzoyl)-propyl]-4-cyano-4-(4-tolyl)piperidine.

By substituting 3-bromotoluene in the first paragraph of this example, γ-chloro-3-methylbutyrophenone is obtained. An equimolar substitution of this compound for γ-chloro-4-fluorobutyrophenone in the procedure of Example 6 yields 1-[γ-(3-methylbenzoyl)propyl]-4-cyano-4-(4-tolyl)piperidine of the structural formula

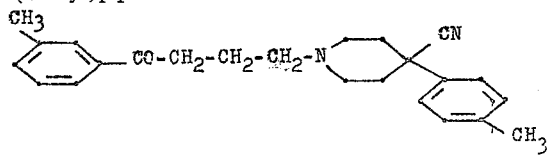

What is claimed is:
1. A compound of the formula

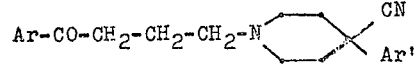

wherein Ar and Ar' are members of the class consisting of phenyl, tolyl, and halophenyl.

2. 1 - [γ - (4 - fluorobenzoyl)propyl] - 4 - cyano-4-phenylpiperidine.

3. 1 - [γ - (4 - fluorobenzoyl)propyl] - 4 - cyano - 4-(4-tolyl)piperidine.

References Cited in the file of this patent

UNITED STATES PATENTS 2,248,018    Eisleb _____ July 1, 1941
2,807,585    Gardner _____ Sept. 24, 1957